United States Patent [19]
Masuda

[11] Patent Number: 5,328,288
[45] Date of Patent: Jul. 12, 1994

[54] HOUSING BLOCK-RETAINING CONSTRUCTION

[75] Inventor: Satoki Masuda, Shizuoka, Japan

[73] Assignee: Yazaki Corporation, Tokyo, Japan

[21] Appl. No.: 965,021

[22] Filed: Oct. 23, 1992

[30] Foreign Application Priority Data

Oct. 24, 1991 [JP] Japan .............................. 3-087210[U]

[51] Int. Cl.$^5$ ...................... H01R 13/627; B25G 3/18
[52] U.S. Cl. .................................... 403/329; 403/326; 439/353
[58] Field of Search ........................ 174/52.1; 200/295; 439/353, 354, 133, 372, 345, 355, 367; 248/221.3, 224.3; 403/326, 329, 321

[56] References Cited

U.S. PATENT DOCUMENTS

| | | | |
|---|---|---|---|
| 4,674,814 | 6/1987 | Hoshino et al. | 439/372 |
| 4,884,978 | 12/1989 | Inaba et al. | 439/354 |
| 4,988,553 | 1/1991 | Saiki et al. | 200/295 |
| 5,022,075 | 6/1991 | Beauval | 439/133 |
| 5,172,998 | 12/1992 | Hatagishi | 403/322 |
| 5,178,552 | 1/1993 | Jinno et al. | 439/345 |
| 5,190,466 | 3/1993 | McVey | 70/58 |

FOREIGN PATENT DOCUMENTS

| | | |
|---|---|---|
| 2355509 | 7/1974 | Fed. Rep. of Germany . |
| 50-107986 | 9/1975 | Japan . |
| 0189877 | 7/1989 | Japan .................................. 439/354 |

Primary Examiner—Peter M. Cuomo
Assistant Examiner—Darnell M. Boucher
Attorney, Agent, or Firm—Sughrue, Mion, Zinn, Macpeak & Seas

[57] ABSTRACT

An object to the present invention is to provide a housing block retaining construciton which allows a release too to be easily operated, and will not interefere with the withdrawal of a housing block. According to the present invention, there is provided that a housing block retaining construciton comprises a retaining lance slanting in the insertion direction provided in an insertion opening of a housing holder, a notch in which a distal end of a release tool is engageable formed in a distal end of the retaining lance, a retaining projection for engagement with the retaining lance provided on a housing block, and a recess for allowing the release tool to pass therethrough formed in that portion of the retaining projection corresponding to the notch.

3 Claims, 4 Drawing Sheets

HOUSING BLOCK-RETAINING CONSTRUCTION

BACKGROUND OF THE INVENTION

This invention relates to a construction for retaining a housing block inserted in an insertion opening formed in a housing holder, the housing block having terminal receiving chambers for respectively receiving terminals each having an electric wire connected thereto.

A retaining construction for retaining a housing block inserted in an insertion opening formed in a housing holder is disclosed, for example, in Unexamined Japanese Utility Model Application No. 50-107986.

Referring to this conventional art, as shown in FIGS. 6 and 7, a plurality of housing blocks 1 are inserted respectively into juxtaposed insertion openings 3 provided in a housing holder 2, each housing block having a generally rectangular parallelepipedic contour and having terminal receiving chambers (not shown) therein.

Retaining steps 4 are formed respectively on opposed inner wall surfaces $3a$ at the inlet side of the insertion opening 3, and retaining projections 5 which are abutted respectively against the retaining steps 4 when the housing block 1 is inserted into the insertion opening 3 are formed respectively on the opposite side surfaces of the housing block 1, thereby limiting the housing block 1 to a predetermined insertion depth.

A retaining construction for the housing block is provided at two inner wall surfaces $3b$ of the insertion opening 3 disposed perpendicular to the two inner wall surfaces $3a$.

The housing block-retaining construction comprises retaining lances 7 each flexible or deformable by a slit 6, and a retaining projection 8 projected from the inner surface of each retaining lance 7. A slanting surface $8a$ progressively increasing in height in the direction of insertion of the housing block 1, as well as a retaining surface $8b$ disposed substantially perpendicular to the insertion direction, is formed on the retaining projection 8.

Therefore, as the housing block 1 is inserted into the insertion opening 3, the front end of the housing block 1 is abutted against the retaining projections 8, and the retaining lances 7 are flexed and deformed to allow the insertion of the housing block 1 because the retaining projections 8 are urged. When the housing block 1 is inserted a predetermined depth with the retaining projections 5 abutted against the retaining steps 4, the rear end of the housing block 1 passes past the retaining projections 8, so that the retaining lances 7 are elastically restored to engage the retaining surfaces $8b$ with the rear end of the housing block 1, thereby retaining the housing block 1.

When the housing block 1 retained by the retaining lances 7 is to be taken out of the housing holder 2, a distal end portion of a tool is inserted into the inlet of the insertion opening 3, and is pushed in a direction generally perpendicular to the insertion direction to flex the two retaining lances 7, and in this condition the housing block 1 must be withdrawn. However, it is difficult to push the distal end of the tool perpendicularly to the insertion direction in the inlet of the narrow insertion opening 3, and besides the pushed tool interferes with the withdrawal of the housing block 1, and therefore withdrawal operation is quite difficult.

SUMMARY OF THE INVENTION

An object of this invention is to overcome these problems, and is to provide a housing block-retaining construction which allows a release tool to be easily operated, and will not interfere with the withdrawal of a housing block.

The above object has been achieved by a housing block-retaining construction comprising a housing block having terminal receiving chambers for respectively receiving terminals each having an electric wire connected thereto; and a housing holder having an insertion opening for receiving said housing block, said housing holder retaining said housing block inserted in said insertion opening; wherein a flexible retaining lance of the cantilever type is provided at an inlet side of said insertion opening of said housing holder, said retaining lance being slanting from an inner peripheral surface of said housing holder in a direction of insertion of said housing block; a notch in which a distal end of a release tool is engageable is formed in a distal end portion of said retaining lance; a retaining projection for engagement with said retaining lance is provided on said housing block; and a recess for allowing said release tool to pass therethrough is formed in that portion of said retaining projection corresponding to said notch.

In the above housing block-retaining construction, when the release tool is inserted, and is pressed against the notch in the distal end portion of the retaining lance, the distal end of the retaining lance elastically deformed by the pressure through the notch is spaced apart from the retaining projection, so that the housing block whose engagement is now released can be withdrawn.

The release tool is inserted in a direction opposite to the direction of insertion of the housing holder, and therefore this tool will not interfere with the withdrawal of the housing block, and the withdrawal can be effected easily.

BRIEF DESCRIPTION OF THE INVENTION

DETAILED DESCRIPTION OF THE PREFERRED EMBODIMENT

Figure 1:
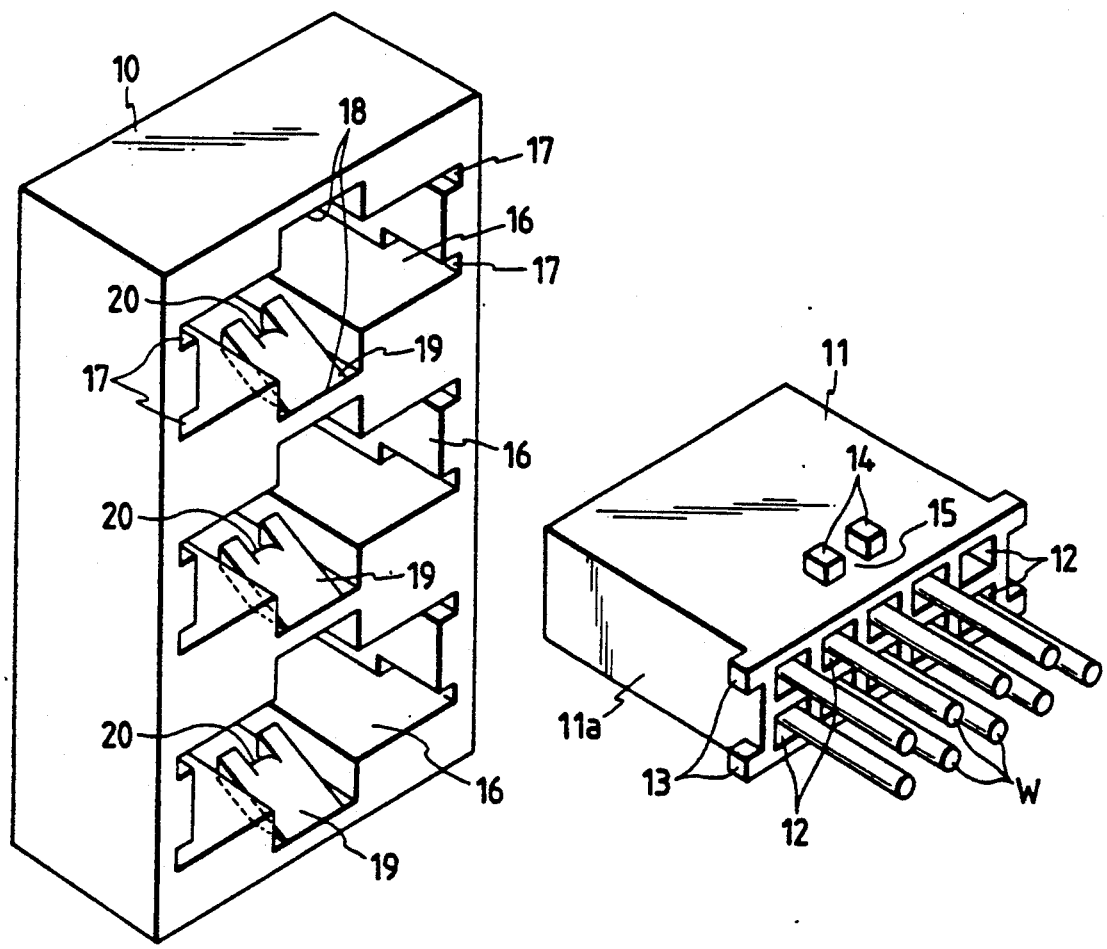
FIG. 1 is a perspective view showing a housing holder and a housing block of the present invention.
Figure 2:
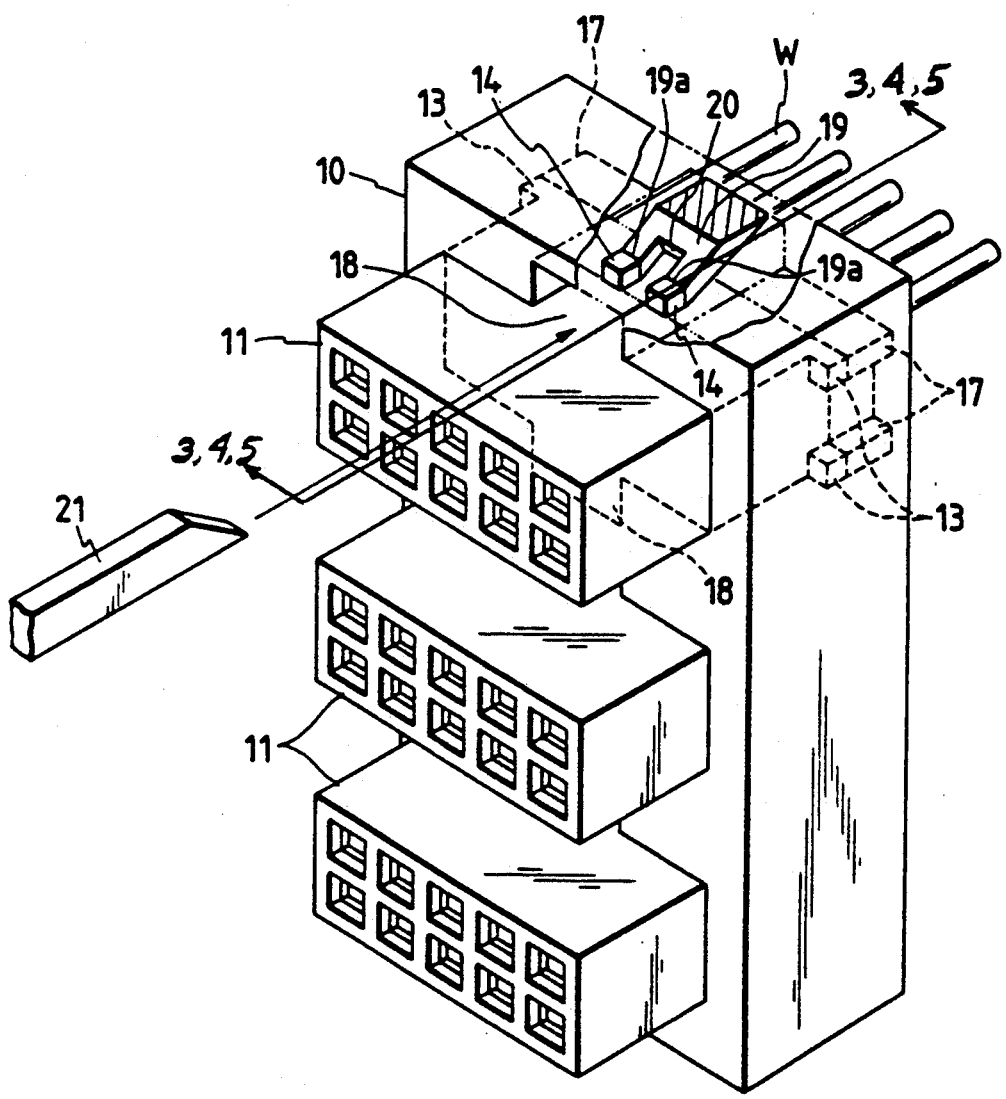
FIG. 2 is a partly-broken, perspective view of the housing holder with the housing blocks inserted therein.

A preferred embodiment of the present invention will now be described with reference to the drawings. FIG. 1 is a perspective view showing a housing holder 10 and a housing block 11, and FIG. 2 is a perspective view of the housing holder 10 with the housing blocks 11 inserted therein.

As shown in FIG. 1, the housing block 11 has a plurality of terminal receiving chambers 12 for respectively receiving terminals (not shown) each having an electric wire W connected thereto. Two stoppers 13 are formed on each of opposite side surfaces $11a$ of the housing block 11 at the rear side thereof. Two retaining projections 14 are formed on a central portion of each of upper and lower surfaces of the housing block 11, and are disposed adjacent to the rear side. A recess 15 is formed between the two retaining projections 14.

The housing holder 10 has three insertion openings 16 into which three housing blocks 11 are adapted to be inserted, respectively. Retaining steps 17 into which the stoppers 13 are adapted to be inserted to a predetermined depth, respectively, are provided at the opposed inner side wall surfaces of each insertion opening 16. An engagement groove 18 in which the retaining projections 14 can be inserted is formed in a generally central portion of each of upper and lower inner wall surfaces of each insertion opening 16, and the engagement groove 18 extends to the rear end face of the housing holder 10. A retaining lance 19 of the cantilever-type is provided in the engagement groove 18 at the housing block inserting side of the insertion opening 16, the retaining lance 19 being slanting in the direction of insertion of the housing block 11.

Figure 3:
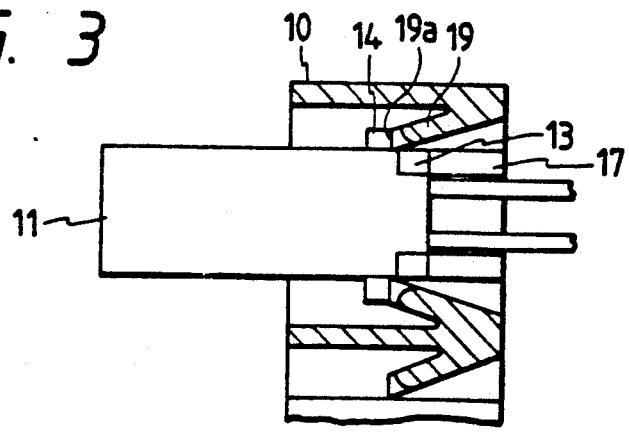
FIG. 3 is a vertical cross-sectional view of the housing block with the housing block inserted therein.
Figure 4:
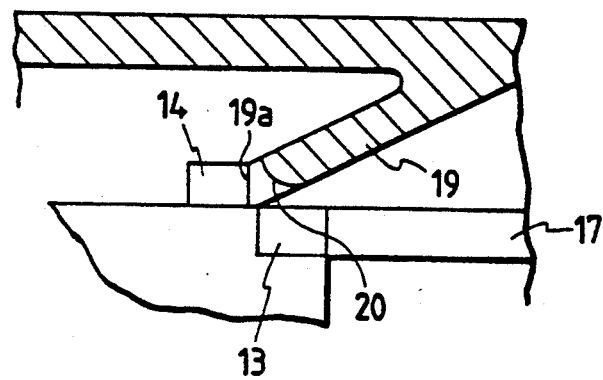
FIG. 4 is an enlarged view of a portion of FIG. 3.

The retaining lance 19 has a flexibility, and when the housing block 11 is to be inserted into the insertion opening 16, the retaining lance 19 is urged at its distal end portion 19a (see FIGS. 2 to 4) by the retaining projections 14, and therefore is flexed and deformed. When the housing block 11 is inserted the predetermined depth, the distal end portion 19a is elastically restored to be engaged with the rear end surfaces of the retaining projections 14.

A notch 20 is provided in that portion of the distal end portion 19a corresponding to the recess 15.

The operation of the above housing block-retaining construction will now be described with reference to the drawings.

As the housing block 11 is inserted into the insertion opening 16 of the housing holder 10, the distal end portions 19a are abutted against the retaining projections, and the retaining lances 19 urged by the retaining projections 14 are flexed and deformed, so that the insertion of the retaining projections 14 continues.

When the housing block 11 is inserted the predetermined depth with the stoppers 13 abutted against the respective retaining steps 17, the retaining projections 14 pass past the distal end portion 19a of the retaining lance 19, and the flexed retaining lance 19 is elastically restored, so that the distal end portion 19a is engaged with the retaining projections 14 (see FIGS. 2 to 4), thereby retaining the housing block 11 in the insertion opening 16.

Figure 5:
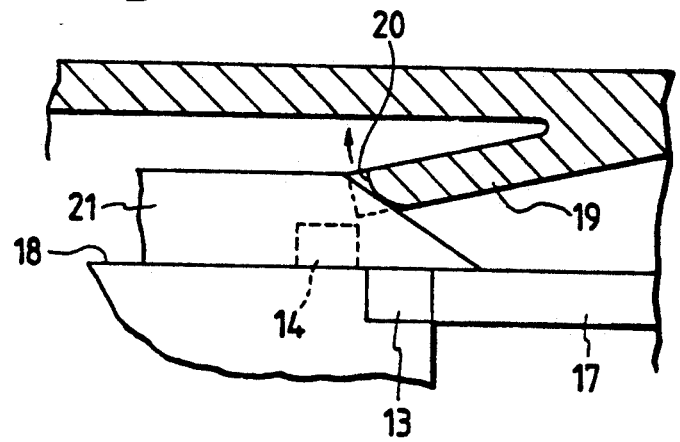
FIG. 5 is a vertical cross-sectional view of an important portion, showing the manner of releasing the engagement by the housing holder.
Figure 6:
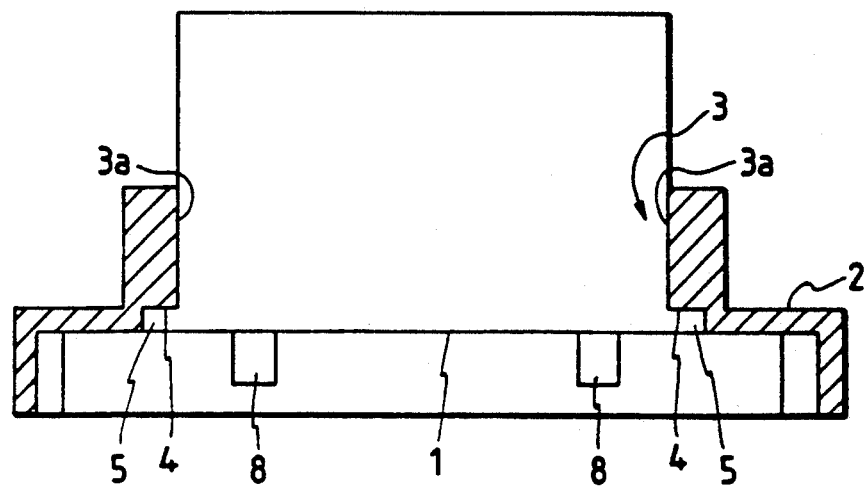
FIG. 6 is a vertical cross-sectional view of a conventional housing block-retaining construction.
Figure 7:
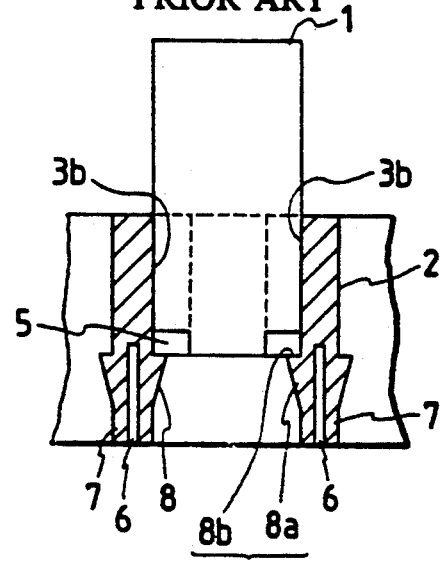
FIG. 7 is a horizontal cross-sectional view of the construction of FIG. 6.

When the housing block 11 is to be taken out of the housing holder 10, a release tool 21 is inserted into the engagement groove 18 from a direction opposite to the direction of insertion of the housing holder 10, as shown in FIG. 2, and the release tool 21 is introduced into the notch 20 of the retaining lance 19 through the recess 15 between the retaining projections 14, and is engaged with the retaining lance 19 to flex and deform the retaining lance 19 (see FIG. 5).

The distal end portion 19a of the flexed retaining lance 19 is spaced apart from the retaining projections 14, thereby releasing the engagement of the housing block 11, and therefore the housing block 11 can be withdrawn without being interfered by the release tool 21.

With the above-mentioned construction of the present invention, the release tool can be easily inserted, and the engagement of the housing block retained in the housing holder can be released with an easy operation. The release tool will not interfere with the withdrawal of the housing block, and therefore the withdrawal of the housing block can be effected easily.

What is claimed is:

1. A housing block-retaining construction comprising:

a housing block having terminal receiving chambers for respectively receiving terminals each having an electric wire connected thereto;

a housing holder having an insertion opening defined at least by upper and lower inner wall surfaces for receiving said housing block, said housing holder retaining said housing block inserted in said insertion opening; and a cantilevered flexible retaining lance provided at an inlet side of said insertion opening of said housing holder, said lance normally projecting into said insertion opening for retaining said housing block therein, wherein a notch, in which a distal end of a release tool is engageable, is formed in a distal end portion of said retaining lance, a retaining projection for engagement with said retaining lance is provided on said housing block, and a recess aligned with said notch for allowing said release tool to pass therethrough is formed in that portion of said retaining projection corresponding to said notch.

2. A housing holder for receiving a housing block according to claim 1, wherein said flexible retaining lance is provided on at least one of said upper and lower inner wall surfaces of said insertion opening of said housing holder.

3. An assembly, comprising:

a housing block having terminal receiving chambers therein for respectively receiving terminals each having an electric wire connected thereto, said housing block having a retaining projection protruding therefrom;

a housing holder having a housing block receiving chamber for receiving said housing block, said housing block being insertable into said housing holder in an insertion direction;

a cantilevered flexible retaining lance secured to said housing holder and protruding in an inclined manner into said housing block receiving chamber, said lance engaging said retaining projection upon complete insertion of said housing block into said housing block receiving chamber; and means, provided in said retaining lance and said retaining projection, for enabling said retaining lance to be disengaged from said retaining projection upon insertion of a release tool from a direction opposite said insertion direction, said means including a notch provided in a distal end of said retaining lance and a recess provided in said retaining projection in alignment with said notch, wherein when said release tool is inserted said tool passes through said recess and engages the notched portion of said retaining lance.

* * * * *